United States Patent [19]

Kerchner, Jr.

[11] 4,191,879
[45] Mar. 4, 1980

[54] HEATING APPARATUS AND CONTROLS THEREFOR

[76] Inventor: Charles F. Kerchner, Jr., R.D. 3, Box 174A, Northampton, Pa. 18067

[21] Appl. No.: 807,831

[22] Filed: Jun. 20, 1977

Related U.S. Application Data

[63] Continuation of Ser. No. 610,636, Sep. 5, 1975, abandoned.

[51] Int. Cl.² .............................................. H05B 1/02
[52] U.S. Cl. ..................................... 219/358; 219/347
[58] Field of Search ........................ 219/342, 347, 358; 119/31-34

[56] References Cited

U.S. PATENT DOCUMENTS

| 2,495,513 | 1/1950 | Doyle | 219/354 |
| 3,246,838 | 4/1966 | Bauer | 219/358 |
| 3,294,955 | 12/1966 | Anoff | 219/347 |
| 3,649,853 | 3/1972 | Kerchner | 219/501 |
| 3,731,055 | 5/1973 | Kerchner, Jr. et al. | 219/358 |
| 4,004,128 | 1/1977 | Marchesi | 219/358 |

Primary Examiner—Bruce A. Reynolds
Assistant Examiner—Bernard Roskoski
Attorney, Agent, or Firm—Robert A. Green

[57] ABSTRACT

The apparatus includes an elongated hood which encloses an infrared heating element. A black body infrared sensing device is adjustably disposed beneath the hood and beneath the heating element in the area where the temperature is to be sensed. The sensing device is connected to a control circuit which is mounted within the hood itself at one end thereof. The control circuit is adapted to be plugged into the conventional A.C. power line.

2 Claims, 7 Drawing Figures

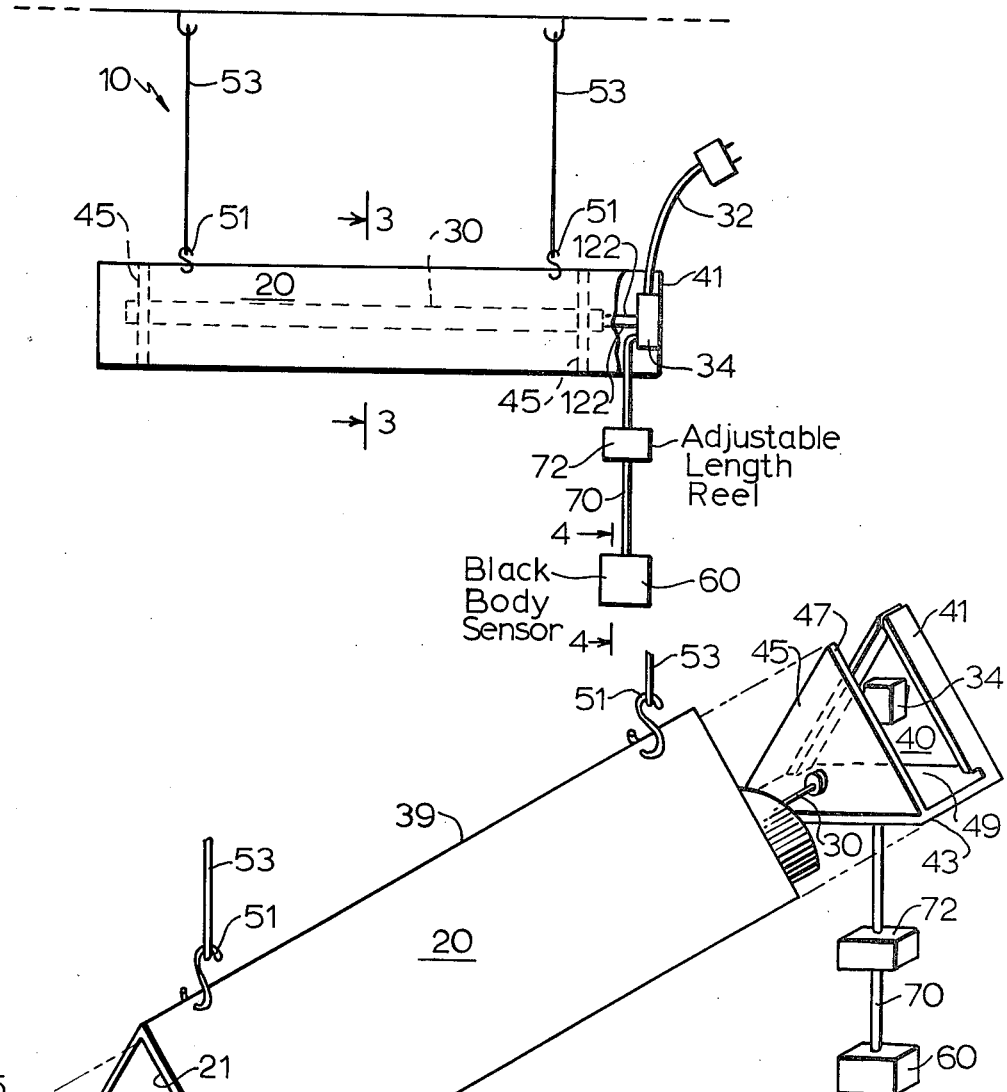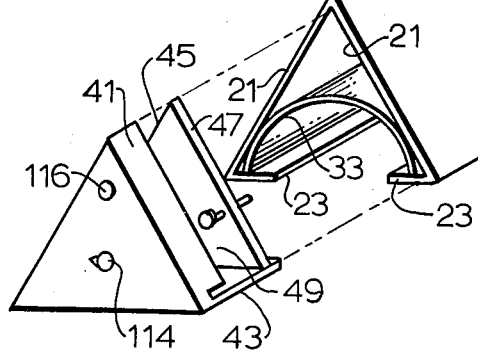

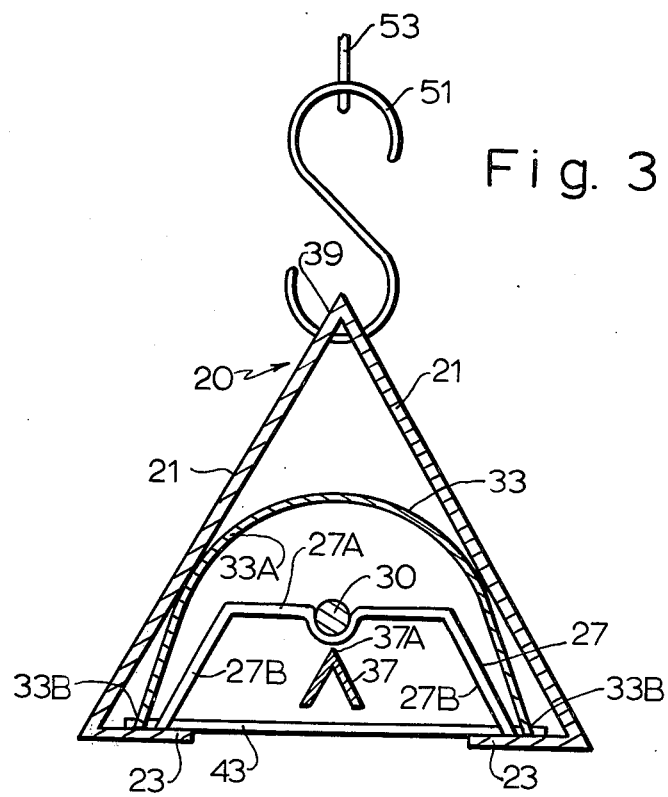
Fig. 3
Fig. 4
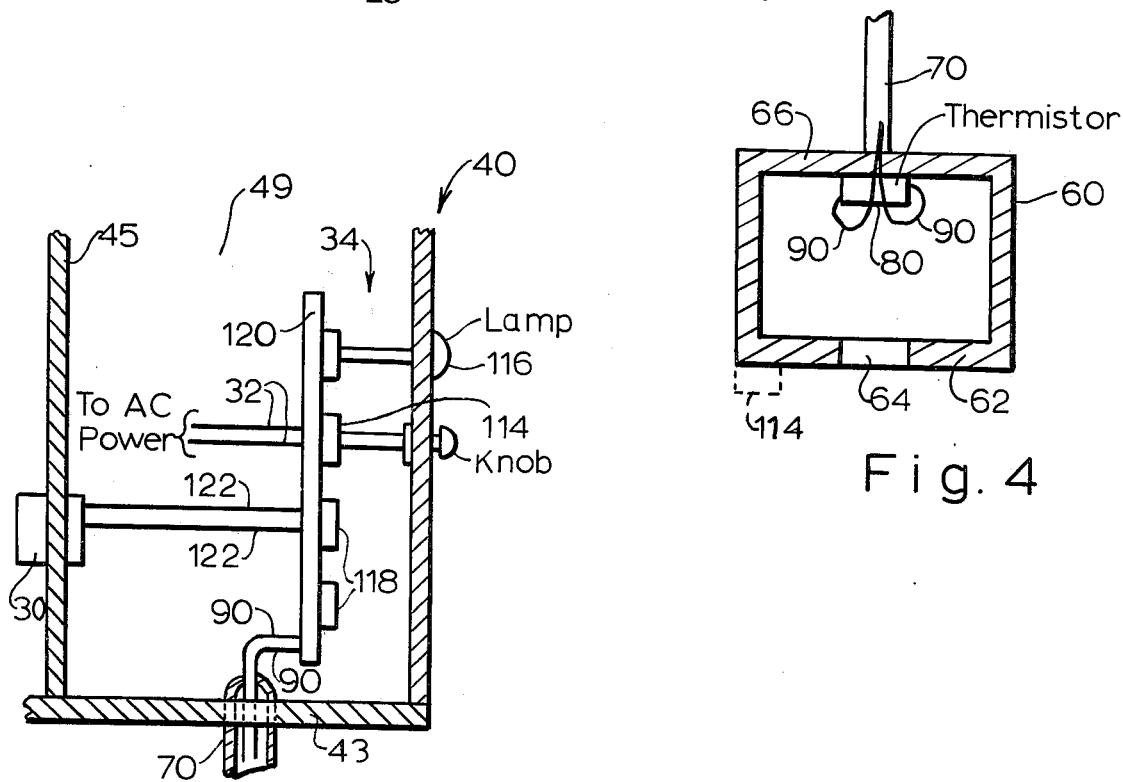
Fig. 5

HEATING APPARATUS AND CONTROLS THEREFOR

CROSS-REFERENCE TO RELATED APPLICATIONS

This application is a continuation of application Ser. No. 610,636; filed Sept. 5, 1975, and now abandoned.

BACKGROUND OF THE INVENTION

Apparatus of the type embodying the invention has been used in the past for providing infrared heating of buildings in which animals are housed and which must be kept warm. Generally, the installation has included a plurality of individual heaters which are electrically connected to a single control box which itself is coupled to the building wiring. This arrangement has been generally satisfactory; however, care had to be taken to be certain that the electrical wiring was carried out correctly and, in general, had to be performed by a licensed electrician. In addition, the cost of the control apparatus was too great to be used with an installation including only a single heating element. The present invention provides an inexpensive current controller integral with the heating element and a black body infrared sensing device coupled thereto. The simplicity of the structure permits individual heating units embodying the invention to be used for spot heating, both for animals and humans.

SUMMARY OF THE INVENTION

Briefly, the invention comprises providing an infrared heating structure including a housing and a heating element and an infrared black body sensor coupled to a control circuit mounted within the heater structure itself.

DESCRIPTION OF THE DRAWINGS

FIG. 1 is a side elevational view of the invention;

FIG. 2 is a perspective view of the apparatus of FIG. 1, partly exploded;

FIG. 3 is a sectional view, along the lines 3—3 in FIG. 1;

FIG. 4 is an enlarged sectional view of a portion of the apparatus of FIG. 1;

FIG. 5 is an elevational view, partly in section, of a portion of the apparatus of FIG. 1;

DESCRIPTION OF THE PREFERRED EMBODIMENTS

Figure 6:
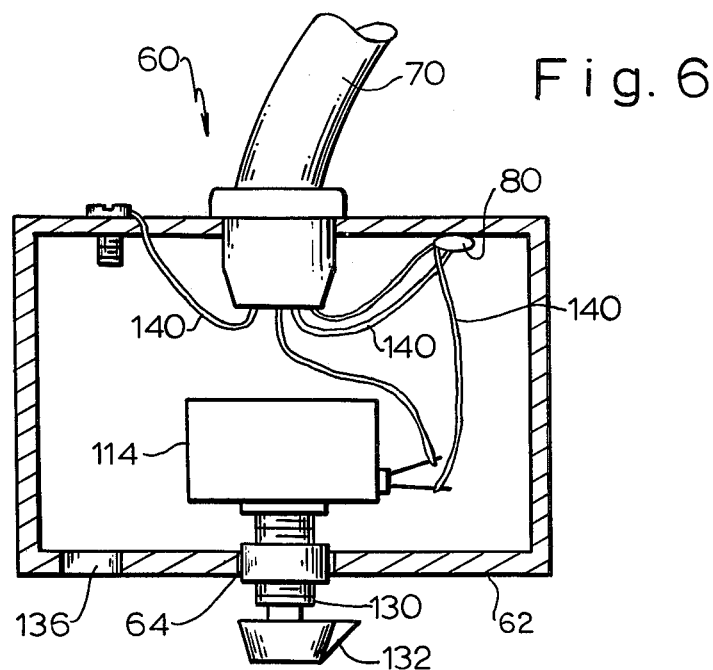
FIG. 6 is an elevational view, partly in section, of a modification of the invention.

A heating system 10 embodying the invention includes a hood 20 which carries an infrared heating element or lamp 30 (FIGS. 2 and 3). The hood has a triangular or semicircular cross-section or the like and, preferably, comprises a single sheet of metal, such as aluminum, bent to the desired shape to form two walls 21 which meet at a vertex 39. The free edges of walls 21 are bent toward each other so that they form coplanar support lips 23. The ends of the hood are closed by plates 40 (FIG. 2) having side walls 41 which snugly engage walls 21 of the hood, and a foot plate 43 which engages or seats on lips 23 of the walls of the hood. The outer surface of the hood is kept as free as possible of holes or protrusions which might act as dust catchers, and the shape is such, particularly with the preferred triangular cross-section, that, where used in an animal enclosure, animal fecal matter or the like will tend not to stick to or accumulate on the hood.

The heating element 30 is preferably an infrared element of any suitable type and power which is suitably supported near its ends by means of adjustable support plates 45. The support plates 45 for the heating element 30 are positioned inboard of the end plates 40 and are spaced therefrom a suitable distance to provide spaces 49 between the support plates 45 and the end plates 40 which can be used, for example, to receive wiring for the heating element, to receive the control circuit, or the like. The side walls 47 of plates 45 form a tight fit with hood 20. The heating element is also supported, approximately at its center, by one or more removable wire supports 27 (FIG. 3) which support the heating element by means of a horizontal portion 27A, from which arms 27B extend and rest on the lips 23 of the hood 20.

The hood 20 also carries a first heat reflector 33 which comprises a curved piece of polished metal such as aluminum which extends along the length of the hood with its concave surface 33A facing the heating element 30 so that it can efficiently reflect heat from the heating element. The reflector 33 is suitably secured to the hood, for example, by having its long edges 33B resting on the lips 23 of walls 21. Thus supported, the reflector 33 can be easily removed for cleaning or replacement.

An optional second reflector 37, which may be used if desired, is of polished metal and preferably extends along the length of the hood parallel to and beneath the heating element 30. This reflector is preferably triangular in shape and has an apex 37A facing the heating element. This element, too, is suitably supported, preferably on the end plates 40. The auxiliary reflector 37 prevents the concentration of the thermal energy directly under the heating element and diffuses the heat energy and thus broadens the area over which heat is propagated beneath the hood.

The hood 20 is supported in a building in any suitable fashion, and, in one arrangement, the apex 39 of the hood 20 is provided with holes in which S-hooks 51 or the like are inserted and to which chains 53 can be connected for securing the hood to the ceiling of a building.

The system 10 includes a black body heat-sensing device 60 which comprises a generally cylindrical body of a metal such as aluminum and having walls of minimal thickness permissible to impart strength while providing optimal heat transfer therethrough. Thus, the walls of body 60 have a thickness of ⅛ inch or less. The body 60 has a bottom wall 62 which is formed with a central opening 64, and a top wall 66, through which a cable 70 extends. A thermistor 80 is mounted on the inner surface of the top wall of body 60, in intimate heat transfer relation therewith, and wires 90 in the cable are connected to the thermistor and extend therefrom to control circuit 34 which is secured to the inner surface of one of the end plates 40 of hood 20. The control circuit 34 may be a bridge circuit of any suitable type, many of which are known in the art. One suitable circuit is shown in U.S. Pat. No. 3,649,853. The thermistor 80 is connected in one leg of the bridge in such a circuit. A power cord 32, adapted to be plugged into the normal 60 cycle consumer power supply is suitably coupled to the hood 20 and control circuit 34.

In operation, the heat sensor 60 hangs down beneath the hood 20, and the cable 70 is of sufficient length so that the sensor can be adjustably positioned by means of reel 72 with respect to the area to be heated. For example, if the system is used for warming chicks, the sensing device 60 is held about one inch from the floor, among the chicks, and offset about eighteen inches from a vertical line extending downwardly from the heating element 30. This provides optimum operation of the system. Other arrangements could be used for controlling the temperature near a desk at which a human being is seated.

The heat-sensing element 60 is preferably a perfect "black body" as defined by physicists. A perfect black body absorbs radiation or thermal flux, and the temperature which it assumes is proportional to the flux which is absorbed. The element 60, while not a perfect black body in the theoretical sense, satisfactorily operates as such, and its temperature is proportional to the thermal flux which reaches it from the heating element. The temperature of the thermistor is substantially the same as that of body or element 60. The position or distance of the black body with respect to the heating element determines the flux it receives and its temperature and the temperature of the thermistor. The resistance of the thermistor is determined by its temperature, and, as part of the control circuit, it acts to modulate the current through the heating element and the flux emitted thereby in accordance with the setting of the control circuit. Thus, the temperature sensed by the chicks or a person can be maintained within close limits. A potentiometer 114, if such is provided in the control circuit 34, is accessible adjacent to the outer wall of plate 40, and a lamp 116 in the control circuit is inserted in the plate 40 to denote the on-off state of the heating lamp 30.

For high-bay mounting, the potentiometer 114 may also be located in the bottom of the sensor 60 itself, as shown in dash lines in FIG. 4, for convenience of operation in adjusting the desired temperature. The necessary conductors would run from the potentiometer, thus located, to control circuit 34.

As illustrated in greater detail in FIG. 5, the control circuit 34 includes circuit elements 118 mounted on a printed circuit board 120 or the like and potted, if desired, and the board is secured to end plate 41 by means of the shaft of potentiometer 114 or with any other suitable means. For convenience, the control circuit assembly 34 may be triangular in form to match the shape of the end plate. Leads 90 to the sensor 60, leads 32 to the A.C. power supply, leads 122 to the heating element 30, and any other required leads extend from the circuit package.

Figure 7:
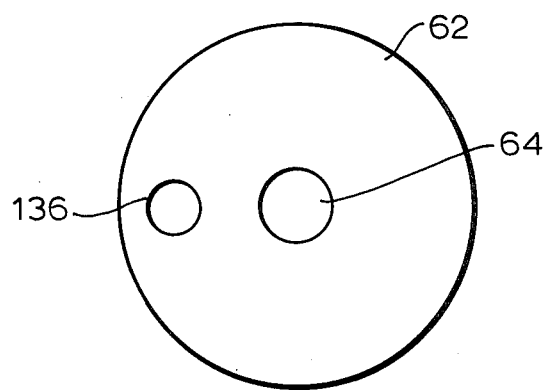
FIG. 7 is a view of the bottom surface of the housing in FIG. 6.

In a preferred construction of the sensor 60 having the potentiometer 114 and referring to FIGS. 6 and 7, the potentiometer is secured to the bottom wall 62, with its hub or shaft 130 secured in the central opening 64 and with the knob 132 lying beneath the bottom wall outside the sensor. An air hole 136 is also provided in the bottom wall. Cable 70 enters the top wall of the sensor at about its center, and the thermistor 80 is mounted on the inner surface of the top wall of the sensor. The required connecting leads 140, comparable to leads 90, are provided between the potentiometer, the thermistor and through cable 70 to control circuit 34.

What is claimed is:

1. Heating and control apparatus for warming chicks and the like comprising
   an elongated hood having a generally triangular cross-section and made up of an elongated main body portion having first and second open ends,
   first end plates secured in said open ends of said hood and inwardly thereof, second end plates secured in said open ends of said hood to close said open ends of said hood,
   said second end plates having inner and outer surfaces,
   an elongated infrared heating element mounted within said hood and extending between said first end plates and directly connected to said first end plates,
   a curved reflector in said hood and extending behind said heating element and between said first end plates for reflecting heat from said element away from said hood,
   a semiconductor control circuit for regulating current flow through said heating element said control circuit being mounted between one of said first end plates and one of said second end plates with an air space surrounding said control circuit,
   said control circuit including a potentiometer and an elongated support plate, at least one circuit module mounted on said support plate, means for connecting said circuit to a power supply and to said heating element, and other means for connecting said circuit to a remote thermal sensor, said other means including a cable and an adjustable length reel,
   said control circuit being held rigidly in place, with said support plate held upright between and generally parallel to said first and second end plates, by means of a shaft of said potentiometer having one end secured to said support plate and the other end thereof secured to and extending through said one second end plate, the other end of said shaft carrying a potentiometer adjustment knob adjacent to the other surface of said one second end plate, and
   a black body sensor secured to the end of said cable remote from said hood and adjustably mounted beneath said hood by said adjustable length reel and said cable and electrically connected in said control circuit by said cable, said black body sensor comprising a cylinder having top and bottom walls and a side wall, said side wall having a black outer surface and having an opening in said bottom wall and having a semiconductor sensor secured inside said cylinder to the upper wall thereof and connected by said cable to said control circuit.

2. Heating and control apparatus for warming chicks and the like comprising an elongated hood having a generally triangular cross-section and made up of an elongated main body portion having first and second open ends,
   first end plates secured in said open ends of said hood and inwardly thereof,
   second end plates secured in said open ends of said hood to close said open ends of said hood,
   said second end plates having inner and outer surfaces,
   an elongated infrared heating element mounted within said hood and extending between said first end plates and directly connected to said first end plates,
   a curved reflector in said hood and extending behind said heating element and between said first end plates for reflecting heat from said element away from said hood, a semiconductor control circuit for regulating current flow through said heating element, said control circuit being mounted between one of said first end plates and one of said second end plates with an air space surrounding said control circuit, said control circuit including a potentiometer, an elongated support plate, at least one circuit module mounted on said support plate, means for connecting said circuit to a power supply and to said heating element, and other means for connecting said circuit to a remote thermal sensor, said other means including a cable, and an adjustable length reel, means for rigidly holding said control circuit in place, with said support plate held upright between and generally parallel to said first and second end plates, a black body body sensor secured to the end of said cable remote from said hood and adjustably mounted beneath said hood by said adjustable length reel and said cable and electrically connected in said control circuit by said cable, said black body sensor comprising a cylinder having top and bottom walls and a side wall, said side wall having a black outer surface and having an opening in said bottom wall and having a semiconductor sensor secured inside said cylinder to the upper wall thereof and connected by said cable to said control circuit, said potentiometer mounted within said black body sensor and having an operating shaft extending through a wall of said sensor whereby said shaft is accessible to and operably by an individual regardless of the height at which the apparatus is mounted.

* * * * *